United States Patent [19]

Yoshida

[11] Patent Number: 5,621,724
[45] Date of Patent: Apr. 15, 1997

[54] ECHO CANCELLING DEVICE CAPABLE OF COPING WITH DETERIORATION OF ACOUSTIC ECHO CONDITION IN A SHORT TIME

[75] Inventor: Toshio Yoshida, Tokyo, Japan

[73] Assignee: NEC Corporation, Japan

[21] Appl. No.: 590,630

[22] Filed: Jan. 24, 1996

[30] Foreign Application Priority Data

Jan. 24, 1995 [JP] Japan .................................. 7-009109

[51] Int. Cl.⁶ .................................................. H04B 3/23
[52] U.S. Cl. ........................................ 370/32.1; 379/410
[58] Field of Search .................................... 370/6, 24, 32, 370/32.1; 379/406, 410, 411; 375/233, 350; 364/724.16, 724.19, 724.2; 333/18, 28 R

[56] References Cited

U.S. PATENT DOCUMENTS

| | | | |
|---|---|---|---|
| 4,645,883 | 2/1987 | Horna et al. | 379/406 |
| 4,760,596 | 7/1988 | Agrawal et al. | 379/410 |
| 4,805,215 | 2/1989 | Miller | 379/411 |
| 5,042,026 | 8/1991 | Koike et al. | 370/32.1 |
| 5,329,472 | 7/1994 | Sugiyama | 364/724.19 |
| 5,396,517 | 3/1995 | Yedid et al. | 370/32.1 |

FOREIGN PATENT DOCUMENTS

| | | |
|---|---|---|
| 64-8755 | 1/1989 | Japan . |
| 383491 | 4/1991 | Japan . |

*Primary Examiner*—Alpus H. Hsu
*Attorney, Agent, or Firm*—Ostrolenk, Faber, Gerb & Soffen, LLP

[57] ABSTRACT

In an echo cancelling device including adaptive echo cancellers for cancelling an echo signal to a microphone amplifier and an echo signal to a receiver amplifier, respectively, there is provided a neural network controller responsive to cancelling errors at every taps in each of the cancellers for searching, with reference to a tap producing a maximum error and to the maximum error, a library containing past echo signal patterns to find an optimum echo signal pattern as a searched pattern, changing weighting factors for the taps in each of the cancellers in accordance with the searched pattern, modifying the searched pattern to eliminate the error when the error becomes small, finely adjusting the weighting factors for the taps, and registering the modified pattern in the library.

3 Claims, 6 Drawing Sheets

ECHO CANCELLING DEVICE CAPABLE OF COPING WITH DETERIORATION OF ACOUSTIC ECHO CONDITION IN A SHORT TIME

BACKGROUND OF THE INVENTION

This invention relates to an echo cancelling device and, in particular, to an echo cancelling device using a neural network.

Recently, an echo cancelling device has been used in various types of communication equipments or systems, such as a teleconference system, or the like.

An example of such a conventional echo cancelling device is disclosed in Japanese Unexamined Patent Publication No. 8755/1989 or No. 83491/1991.

For example, the Japanese Unexamined Patent Publication No. 8755/1989 shows a teleconference system using an echo cancelling device. The teleconference system comprises a microphone, a loudspeaker, an echo canceller, a level detection circuit, a comparator, a level detection circuit, a switch, a noise producing circuit, a communication circuit, and two amplifier circuits. One of the amplifier circuits is supplied as an input transmission speech signal with a speech signal produced by the microphone and amplifies the input transmission speech signal to produce an amplified transmission speech signal. The amplified transmission speech signal is sent through a transmission path to be led to the communication circuit as an output transmission speech signal. The communication circuit delivers the output transmission speech signal to a channel. On the other hand, the communication circuit receives an input reception speech signal through the channel and delivers the input reception speech signal through a reception path to another one of the amplifier circuits. The another one of the amplifier circuits amplifies the input reception speech signal to produce an amplified reception speech signal which is supplied to the loudspeaker as an output reception speech signal. The loudspeaker converts the output reception speech signal into a reception speech sound. The reception speech sound intrudes or enters into the microphone as an echo signal. The echo canceller for cancelling such intrusion of the reception speech sound is connected between the reception path and the transmission path.

However, in the above-described teleconference system, every time when an acoustic echo condition around the loudspeaker and the microphone is suddenly deteriorated (for example, the teleconference system is located in a mobile compartment and the door of the compartment is opened and closed), the loudspeaker produces the white noise for a training operation. This interferes the communication. Even if the acoustic echo condition is not so deteriorated, an adaptive calculation process is required in order to conform to the variation of the condition. Such calculation process takes a time duration ranging from several hundred milliseconds to several seconds. In this time duration, an unstable state is continued where a strong echo sound is audibly felt.

On the other hand, an echo cancelling device disclosed in the Japanese Unexamined Patent Publication No. 83491/1991 comprises a howling detecting section for detecting a communication fault such as howling, a training sound producing section for producing a training sound when the howling detecting section detects the communication fault, and an echo learning section for resetting a new fundamental echo characteristic when the training sound producing section produces the training sound. In the above-mentioned echo cancelling device also, the training sound is produced every time when the howling detecting section detects occurrence of howling. In that event, the communication is interfered like in the above-mentioned teleconference system.

SUMMARY OF THE INVENTION

It is therefore an object of this invention to provide an echo cancelling device which dispenses with a training operation by the use of a training sound such as a white noise when an acoustic echo condition is deteriorated and which is therefore capable of coping with deterioration of the acoustic echo condition in a short time.

Other objects of this invention will become clear as the description proceeds.

According to an aspect of the present invention, there is provided an echo cancelling device comprising a first transmission-side amplifier for amplifying an input transmission speech signal, a transmission-side adaptive echo canceller connected to the first transmission-side amplifier, a second transmission-side amplifier connected to the transmission-side adaptive echo canceller for amplifying an output signal of the transmission-side adaptive echo canceller to produce an output transmission speech signal, a first reception-side amplifier for amplifying an input reception speech signal, a reception-side adaptive echo canceller connected to the first reception-side amplifier, and a second reception-side amplifier connected to the reception-side adaptive echo canceller for amplifying an output signal of the reception-side adaptive echo canceller to produce an output reception speech signal, the transmission-side adaptive echo canceller being connected also to the reception-side adaptive echo canceller and being for producing a transmission-side pseudo echo signal in response to the output signal of the reception-side adaptive echo canceller and for cancelling the transmission-side pseudo echo signal from an output signal of the first transmission-side amplifier to produce an echo-cancelled transmission speech signal as the output signal of the transmission-side adaptive echo canceller, the reception-side adaptive echo canceller being connected also to the transmission-side adaptive echo canceller and being for producing a reception-side pseudo echo signal in response to the output signal of the transmission-side adaptive echo canceller and for cancelling the reception-side pseudo echo signal from an output signal of the first reception-side amplifier to produce an echo-cancelled reception speech signal as the output signal of the reception-side adaptive echo canceller, the echo cancelling device further comprising: a neural network type controller using a neural network and connected to the transmission-side adaptive echo canceller; the neural network type controller having an echo signal pattern library containing, as registered echo signal patterns, past echo signal patterns of past echo signals each of which is a part of the output reception speech signal that enters into the first transmission-side amplifier, the neural network type controller being responsive to cancelling errors from a plurality of taps of the transmission-side adaptive echo canceller and carrying out estimation of a maximum error producing tap, which is one of the plurality of taps that produces a maximum error, and of the maximum error of the maximum error producing tap, search of the registered echo signal patterns registered in the echo signal pattern library to find adaptive echo signal patterns adapted to the maximum error producing tap and the maximum error as estimated, change of weighting factors for the plurality of taps of the transmission-side adaptive echo canceller in accordance with the adaptive echo signal patterns as searched, identification of a particular adaptive echo signal pattern minimizing the cancelling errors from the plurality of taps of the transmission-side adaptive echo canceller as a result of the above-mentioned change of the weighting factors, preparation of a modified echo signal pattern for eliminating a residual error of the particular adaptive echo signal pattern as identified, fine adjustment of the weighting factors for the plurality of taps of the transmission-side adaptive echo canceller in accordance with the modified echo signal pattern, and registration of the modified echo signal pattern in the echo signal pattern library.

According to another aspect of the present invention, there is provided an echo cancelling device comprising a first transmission-side amplifier for amplifying an input transmission speech signal, a transmission-side adaptive echo canceller connected to the first transmission-side amplifier, a second transmission-side amplifier connected to the transmission-side adaptive echo canceller for amplifying an output signal of the transmission-side adaptive echo canceller to produce an output transmission speech signal, a first reception-side amplifier for amplifying an input reception speech signal, a reception-side adaptive echo canceller connected to the first reception-side amplifier, and a second reception-side amplifier connected to the reception-side adaptive echo canceller for amplifying an output signal of the reception-side adaptive echo canceller to produce an output reception speech signal, the transmission-side adaptive echo canceller being connected also to the reception-side adaptive echo canceller and being for producing a transmission-side pseudo echo signal in response to the output signal of the reception-side adaptive echo canceller and for cancelling the transmission-side pseudo echo signal from an output signal of the first transmission-side amplifier to produce an echo-cancelled transmission speech signal as the output signal of the transmission-side adaptive echo canceller, the reception-side adaptive echo canceller being connected also to the transmission-side adaptive echo canceller and being for producing a reception-side pseudo echo signal in response to the output signal of the transmission-side adaptive echo canceller and for cancelling the reception-side pseudo echo signal from an output signal of the first reception-side amplifier to produce an echo-cancelled reception speech signal as the output signal of the reception-side adaptive echo canceller, the echo cancelling device further comprising: a neural network type controller using a neural network and connected to the reception-side adaptive echo canceller; the neural network type controller having an echo signal pattern library containing, as registered echo signal patterns, past echo signal patterns of past echo signals each of which is a part of the output transmission speech signal that enters into the first reception-side amplifier, the neural network type controller being responsive to cancelling errors from a plurality of taps of the reception-side adaptive echo canceller and carrying out estimation of a maximum error producing tap, which is one of the plurality of taps that produces a maximum error, and of the maximum error of the maximum error producing tap, search of the registered echo signal patterns registered in the echo signal pattern library to find adaptive echo signal patterns adapted to the maximum error producing tap and the maximum error as estimated, change of weighting factors for the plurality of taps of the reception-side adaptive echo canceller in accordance with the adaptive echo signal patterns as searched, identification of a particular adaptive echo signal pattern minimizing the cancelling errors from the plurality of taps of the reception-side adaptive echo canceller as a result of the above-mentioned change of the weighting factors, preparation of a modified echo signal pattern for eliminating a residual error of the particular adaptive echo signal pattern as identified, fine adjustment of the weighting factors for the plurality of taps of the reception-side adaptive echo canceller in accordance with the modified echo signal pattern, and registration of the modified echo signal pattern in the echo signal pattern library.

DETAILED DESCRIPTION OF THE PREFERRED EMBODIMENT

Figure 1:
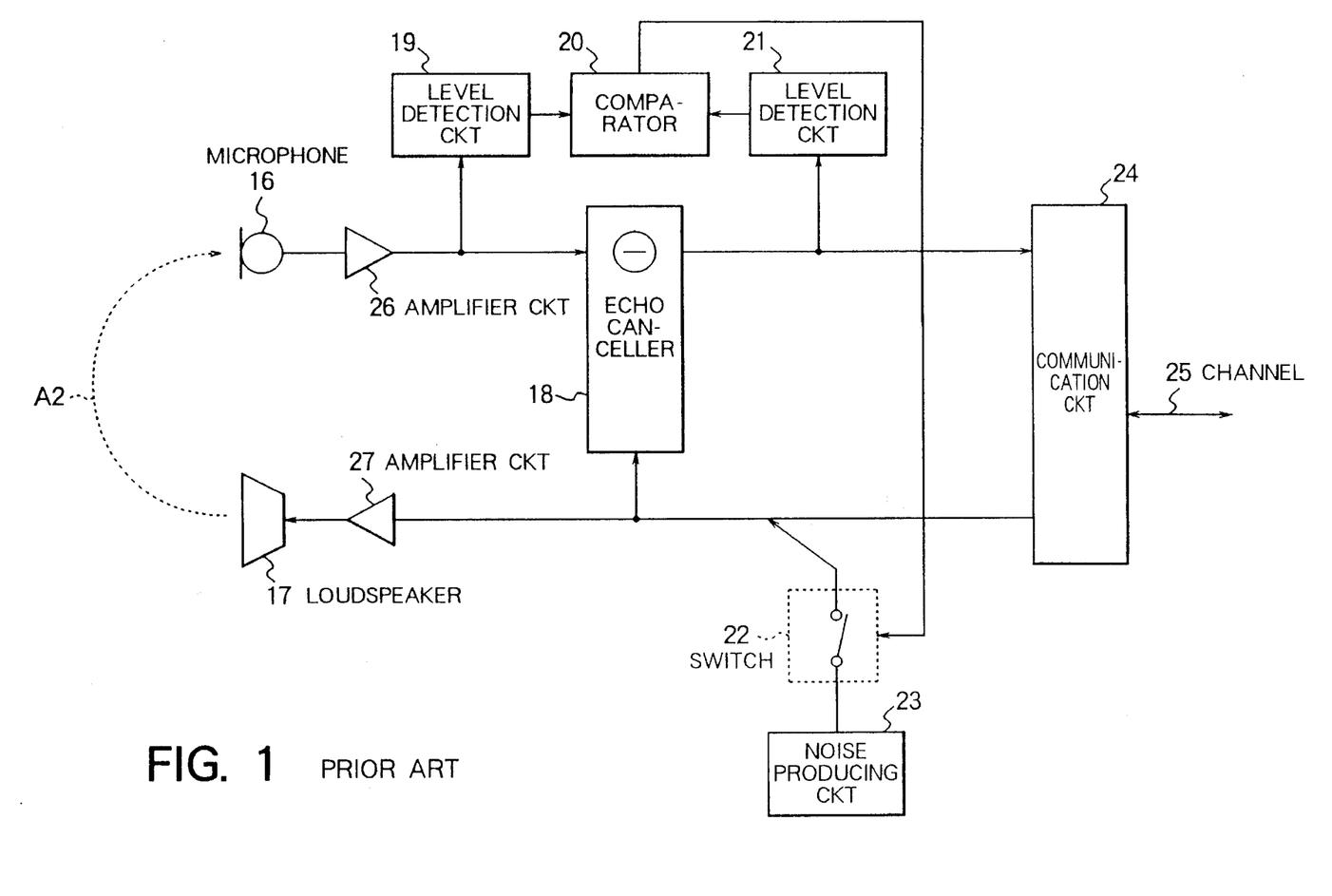
FIG. 1 is a block diagram of a conventional teleconference system.

Referring to FIG. 1, a conventional echo cancelling device will first be described for a better understanding of the present invention.

FIG. 1 shows a teleconference system disclosed in Japanese Unexamined Patent Publication No. 8755/1989. The teleconference system comprises a microphone 16, a loudspeaker 17, an echo canceller 18, a level detection circuit 19, a comparator 20, a level detection circuit 21, a switch 22, a noise producing circuit 23, a communication circuit 24, and amplifier circuits 26 and 27. The amplifier circuit 26 is supplied as an input transmission speech signal with a speech signal produced by the microphone 16 and amplifies the input transmission speech signal to produce an amplified transmission speech signal. The amplified transmission speech signal is sent through a transmission path to be led to the communication circuit 24 as an output transmission speech signal. The communication circuit 24 delivers the output transmission speech signal to a channel 25. On the other hand, the communication circuit 24 receives an input reception speech signal through the channel 25 and delivers the input reception speech signal through a reception path to the amplifier circuit 27. The amplifier circuit 27 amplifies the input reception speech signal to produce an amplified reception speech signal which is supplied to the loudspeaker 17 as an output reception speech signal. The loudspeaker 17 converts the output reception speech signal into a reception speech sound. The reception speech sound intrudes or enters into the microphone 16 as an echo signal. The echo canceller 18 for cancelling such intrusion of the reception speech sound is connected between the reception path and the transmission path.

The level detection circuits 19 and 21 detect the level of an echo-uncancelled signal (amplified transmission speech signal) and the level of an echo-cancelled signal (output transmission speech signal), respectively. The comparator 20 compares the level of the echo-uncancelled signal and the level of the echo-cancelled signal with each other to produce a comparison result. When the comparison result indicates that the level of the echo-cancelled signal is greater than that of the echo-uncancelled signal, occurrence of howling is judged. When the comparator 20 produces the comparison result indicating that the level of the echo-cancelled signal is greater than that of the echo-uncancelled signal, the switch 22 is turned on for a predetermined time interval. When the switch 22 is turned on, a white noise is delivered from the noise producing circuit 23 to the reception path and is amplified by the amplifier circuit 27 to produce a noise (training noise) from the loudspeaker 17. The training noise also intrudes as an echo signal into the microphone 16 as depicted by a broken-line arrow A2. The echo canceller 18 estimates the intruding noise so as to cancel the intrusion of the training noise.

In the above-described teleconference system, every time when an acoustic echo condition around the loudspeaker and the microphone is suddenly deteriorated (for example, the teleconference system is located in a mobile compartment and the door of the compartment is opened and closed), the loudspeaker produces the white noise for a training operation. This interferes the communication. Even if the acoustic echo condition is not so deteriorated, an adaptive calculation process is required in order to conform to the variation of the condition. Such calculation process takes a time duration ranging from several hundred milliseconds to several seconds. In this time duration, an unstable state is continued where a strong echo sound is audibly felt.

On the other hand, an echo cancelling device similar to the above-described teleconference system is disclosed in Japanese Unexamined Patent Publication No. 83491/1991. The echo cancelling device comprises a howling detecting section for detecting a communication fault such as howling, a training sound producing section for producing a training sound when the howling detecting section detects the communication fault, and an echo learning section for re-setting a new fundamental echo characteristic when the training sound producing section produces the training sound. In the above-mentioned echo cancelling device also, the training sound is produced every time when the howling detecting section detects occurrence of howling. In that event, the communication is interfered like in the above-mentioned teleconference system.

Referring now to FIGS. 2 to 7, description will proceed to an echo cancelling device according to a preferred embodiment of the present invention.

Figure 2:
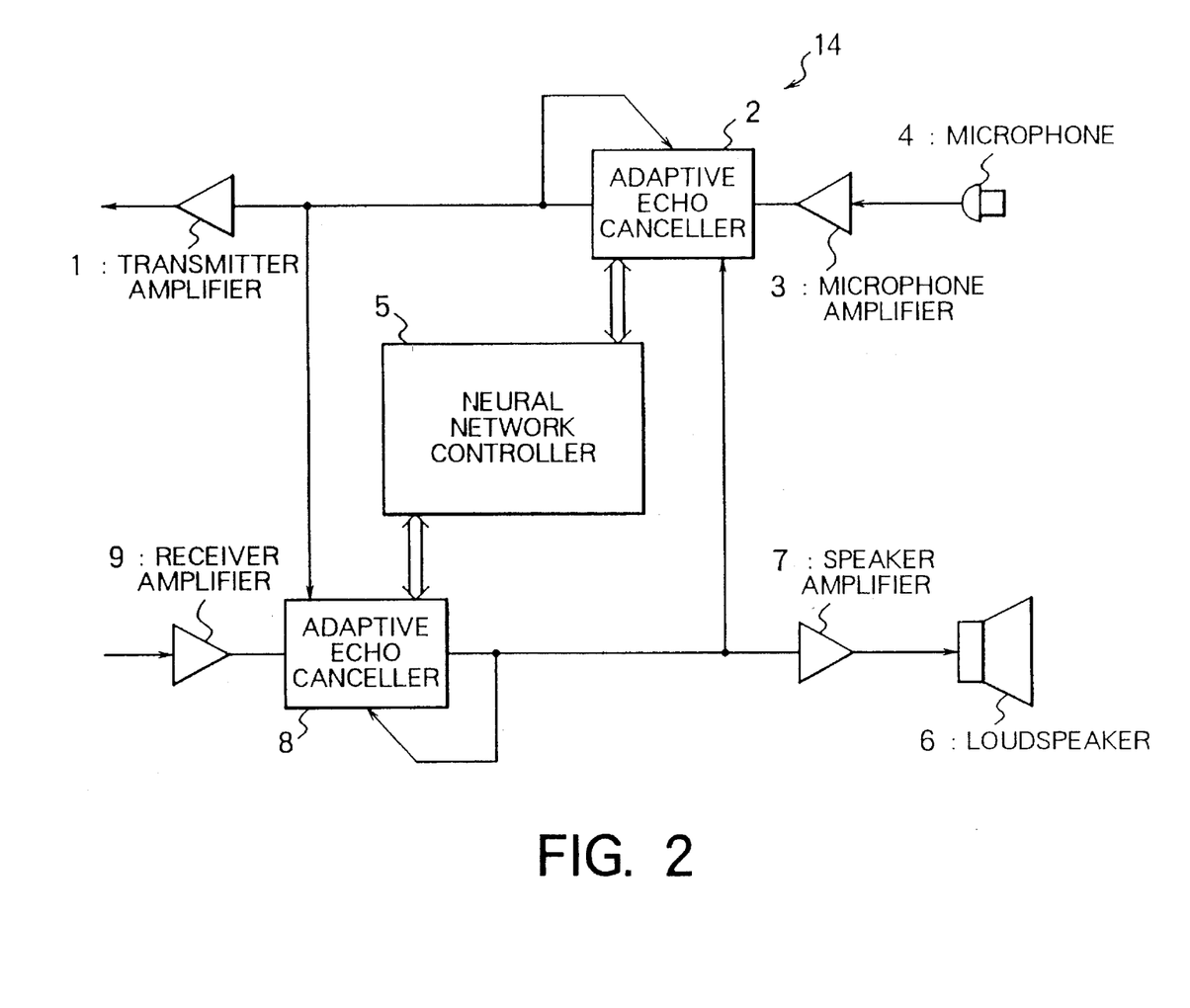
FIG. 2 is a block diagram of an echo cancelling device according to a preferred embodiment of this invention.

Referring to FIG. 2, an echo cancelling device 14 according to the preferred embodiment of this invention comprises a microphone amplifier (first transmission-side amplifier) 3 for amplifying an input transmission speech signal, an adaptive echo canceller (transmission-side adaptive echo canceller) 2 connected to the microphone amplifier 3, a transmitter amplifier (second transmission-side amplifier) 1 connected to the adaptive echo canceller 2 for amplifying an output signal of the adaptive echo canceller 2 to produce an output transmission speech signal, a receiver amplifier (first reception-side amplifier) 9 for amplifying an input reception speech signal, an adaptive echo canceller (reception-side adaptive echo canceller) 8 connected to the receiver amplifier 9, and a speaker amplifier (second reception-side amplifier) 7 connected to the adaptive echo canceller 8 for amplifying an output signal of the adaptive echo canceller 8 to produce an output reception speech signal. The adaptive echo canceller 2 is connected also to the adaptive echo canceller 8 and is for producing a transmission-side pseudo echo signal in response to the output signal of the adaptive echo canceller 8 and for cancelling the transmission-side pseudo echo signal from an output signal of the microphone amplifier 3 to produce an echo-cancelled transmission speech signal as the output signal of the adaptive echo canceller 2. The adaptive echo canceller 8 is connected also to the adaptive echo canceller 2 and is for producing a reception-side pseudo echo signal in response to the output signal of the adaptive echo canceller 2 and for cancelling the reception-side pseudo echo signal from an output signal of the receiver amplifier 9 to produce an echo-cancelled reception speech signal as the output signal of the adaptive echo canceller 8. The echo cancelling device 14 further comprises a neural network controller 5 using a neural network and connected to the adaptive echo canceller 2 and the adaptive echo canceller 8.

The microphone amplifier 3 of the echo cancelling device 14 is connected to a microphone 4. The speaker amplifier 7 of the echo cancelling device 14 is connected to a loudspeaker 6.

In the echo cancelling device 14, the microphone 4 converts an input speech sound into an electrical signal and delivers the electrical signal to the microphone amplifier 3 as the input transmission speech signal. The microphone amplifier 3 amplifies (adjusts the level of) the input transmission speech signal. The adaptive echo canceller 2 adds the transmission-side pseudo echo signal to the output signal of the microphone amplifier 3 and cancels the transmission-side pseudo echo signal (namely, an echo signal from the loudspeaker 6 to the microphone 4) from the output signal of the microphone amplifier 3. The transmitter amplifier 1 amplifies (adjusts the level of) the output signal of the adaptive echo canceller 2 to produce the output transmission speech signal.

The receiver amplifier 9 amplifies (adjusts the level of) the input reception speech signal. The adaptive echo canceller 8 adds the reception-side pseudo echo signal to the output signal of the receiver amplifier 9 and cancels the reception-side pseudo echo signal from the output signal of the receiver amplifier 9. The speaker amplifier 7 amplifies (adjusts the level of) the output signal of the adaptive echo canceller 8 to produce the output reception speech signal. The loudspeaker 6 produces the output reception speech signal as a speech sound.

The neural network controller 5 is supplied with cancelling errors from a plurality of taps of each of the adaptive echo cancellers 2 and 8 and carries out estimation of a maximum error producing tap, which is one of the plurality of taps that produces a maximum error, and of the maximum error of the maximum error producing tap, search of past echo signal patterns registered in an echo signal pattern library to find adaptive echo signal patterns adapted to the maximum error producing tap and the maximum error as estimated, change of weighting factors for the plurality of taps of each of the adaptive echo cancellers 2 and 8 in accordance with the adaptive echo signal patterns as searched, identification of a particular adaptive echo signal pattern minimizing the cancelling errors from the plurality of taps of each of the adaptive echo cancellers 2 and 8 as a result of the above-mentioned change of the weighting factors, preparation of a modified echo signal pattern for eliminating a residual error of the particular adaptive echo signal pattern as identified, fine adjustment of the weighting factors for the plurality of taps of each of the adaptive echo cancellers 2 and 8 in accordance with the modified echo signal pattern, and registration of the modified echo signal pattern in the echo signal pattern library.

Figure 3:
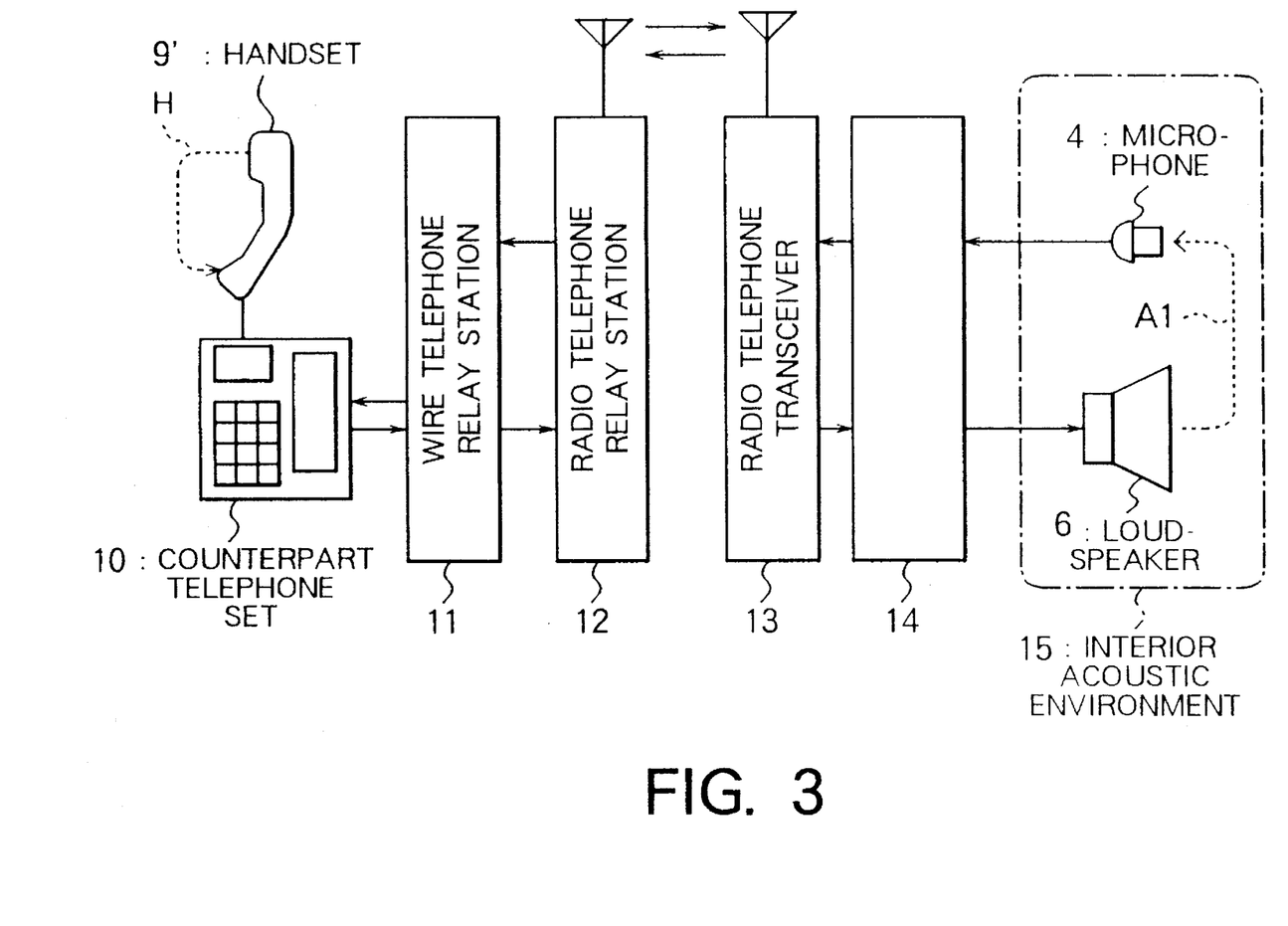
FIG. 3 is a block diagram of a hands-free mobile telephone system using the echo cancelling device illustrated in FIG. 2.

FIG. 3 shows an example of a hands-free mobile telephone system to which the echo cancelling device 14 in FIG. 2 is applied. The loudspeaker 6 and the microphone 4 are located in an interior acoustic environment 15. In response to the output reception speech signal of the echo cancelling device 14, the loudspeaker 6 produces a sound signal which reaches through an echo path A1 to the microphone 4 to return to the echo cancelling device 14 as the input transmission speech signal. At this time, when the interior acoustic environment 15 is altered in response to variation of conditions such as an open/close operation of a door or a window and the number of passengers, a group delay echo signal pattern is widely varied. With respect to the echo cancelling device 14, signal echo occurring at the side of the channel is added with signal echo inside a radio telephone transceiver 13, signal echo at a radio telephone relay station 12, signal echo at a wire telephone relay station 11, signal echo at a counterpart telephone set 10, and signal echo at a handset 9' through an acoustic echo path H before returning to the echo cancelling device 14. It is noted here that the group delay echo signal pattern is widely varied in response to alteration of the types of the radio telephone relay station 12, the wire telephone relay station 11, the counterpart telephone set 10, and the handset 9'.

Figure 4:
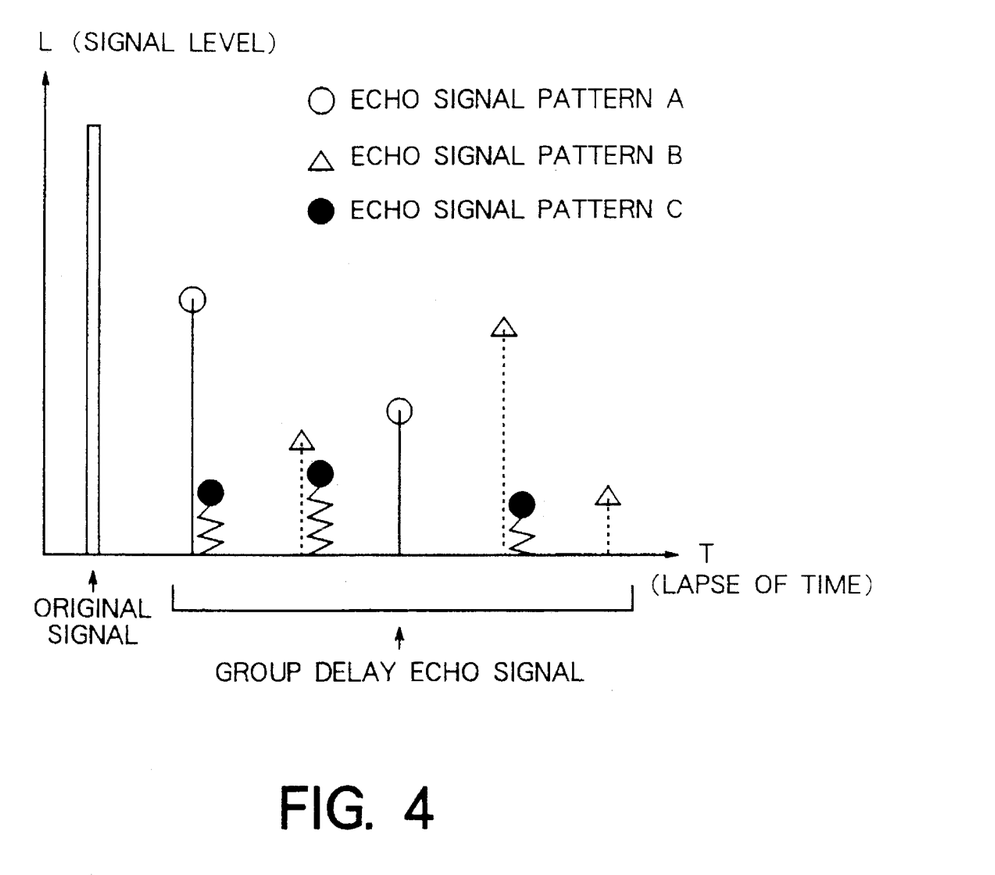
FIG. 4 is a view for describing group delay echo signal patterns in the system illustrated in FIG. 3.

FIG. 4 shows examples of the group delay echo signal pattern. Herein, three types of patterns A, B, and C are illustrated as group delay echo signal patterns in response to transmission of an original burst signal.

Figure 5:
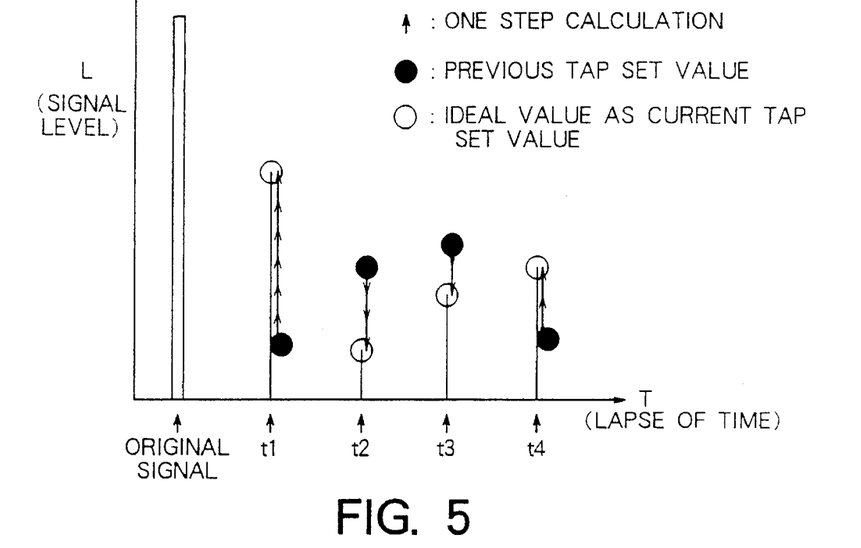
FIG. 5 is a view for describing a process of cancelling a group delay echo signal by the use of a typical echo cancelling device.
Figure 6:
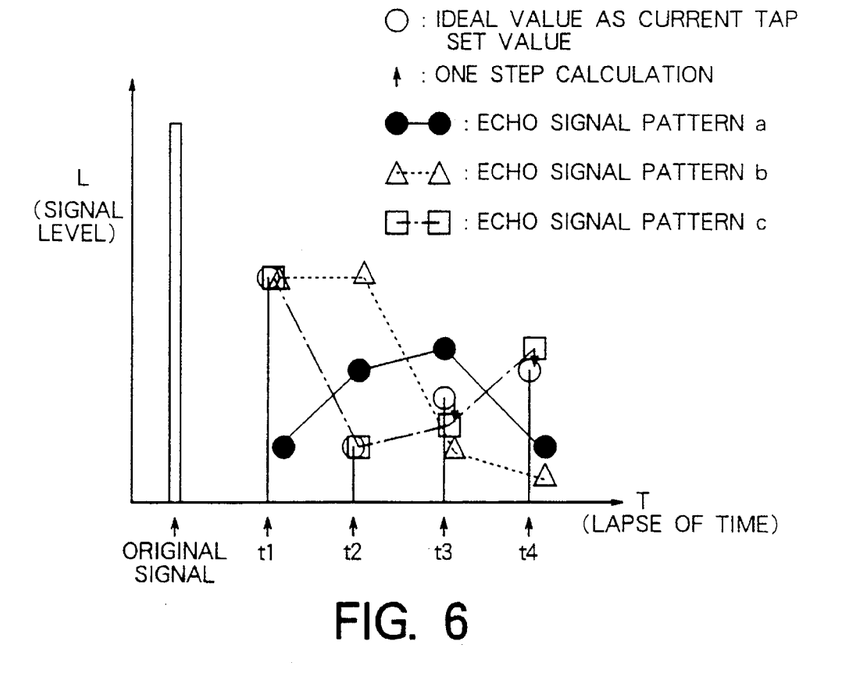
FIG. 6 is a view for describing a process of cancelling the group delay echo signal by the use of the echo cancelling device illustrated in FIG. 2.

FIGS. 5 and 6 show manners of actually cancelling a group delay echo signal. FIG. 5 represents a process of cancelling the echo signal by a typical echo cancelling device. FIG. 6 shows a process of cancelling the echo signal by the echo cancelling device 14 illustrated in FIG. 2. In FIGS. 5 and 6, t1 to t4 represent the taps.

As illustrated in FIG. 5, in the typical echo cancelling device, cancellation is carried out by the use of previous tap set values. Feeding back the result of cancellation, one step calculation is carried out to change weighting factors for the taps so that the cancelling error of each tap becomes minimum. Again feeding back the result, one step calculation is carried out to change the weighting factors for the taps so that the cancelling error of each tap becomes minimum. By repeating the above-mentioned operation, ideal values as current tap set values are approached.

In the echo cancelling device 14 in FIG. 2 on the other hand, each of the adaptive echo cancellers 2 and 8 carries out cancellation with the previous tap set values according to a previous echo signal pattern being given to the plurality of taps of each of the adaptive echo cancellers 2 and 8, as illustrated in FIG. 6. In this event, the neural network controller 5 reads the cancelling error (difference) at every tap of each of the adaptive echo cancellers 2 and 8 and estimates a maximum error producing tap (t1 in FIG. 6) which produces a maximum error. Then, the neural network controller 5 searches an echo signal pattern library containing a file of past echo signal patterns and reads, in the order from a higher frequency of occurrence, those echo signal patterns (echo signal patterns b and c in FIG. 6) having optimum weighting factors for the maximum error producing tap as read-out echo signal patterns. In accordance with the read-out echo signal patterns, the weighting factors for the plurality of taps of each of the adaptive echo cancellers 2 and 8 is modified. At this time also, the neural network controller 5 monitors the cancelling errors at the plurality of taps of each of the adaptive echo cancellers 2 and 8 and identifies, among the read-out echo signal patterns, a particular pattern (echo signal pattern c in FIG. 6) which minimizes the cancelling errors at the plurality of taps of each of the adaptive echo cancellers 2 and 8 and which will be referred to as an identified echo signal pattern. The neural network controller 5 finely adjusts the residual error of the identified echo signal pattern to produce a modified echo signal pattern. In accordance with the modified echo signal pattern, fine adjustment is made of the weighting factors for the plurality of taps of each of the adaptive echo cancellers 2 and 8. Thus, the ideal values as current tap set values are approached. When the echo signal pattern library has a similar pattern having a high similarity with the modified echo signal pattern, the neural network controller 5 slightly modifies the similar pattern in accordance with the weighting factors and re-registers the resultant pattern. When the echo signal pattern library has no similar pattern having a high similarity with the modified echo signal pattern, the neural network controller 5 registers the modified echo signal pattern in accordance with the frequency of occurrence.

Figure 7:
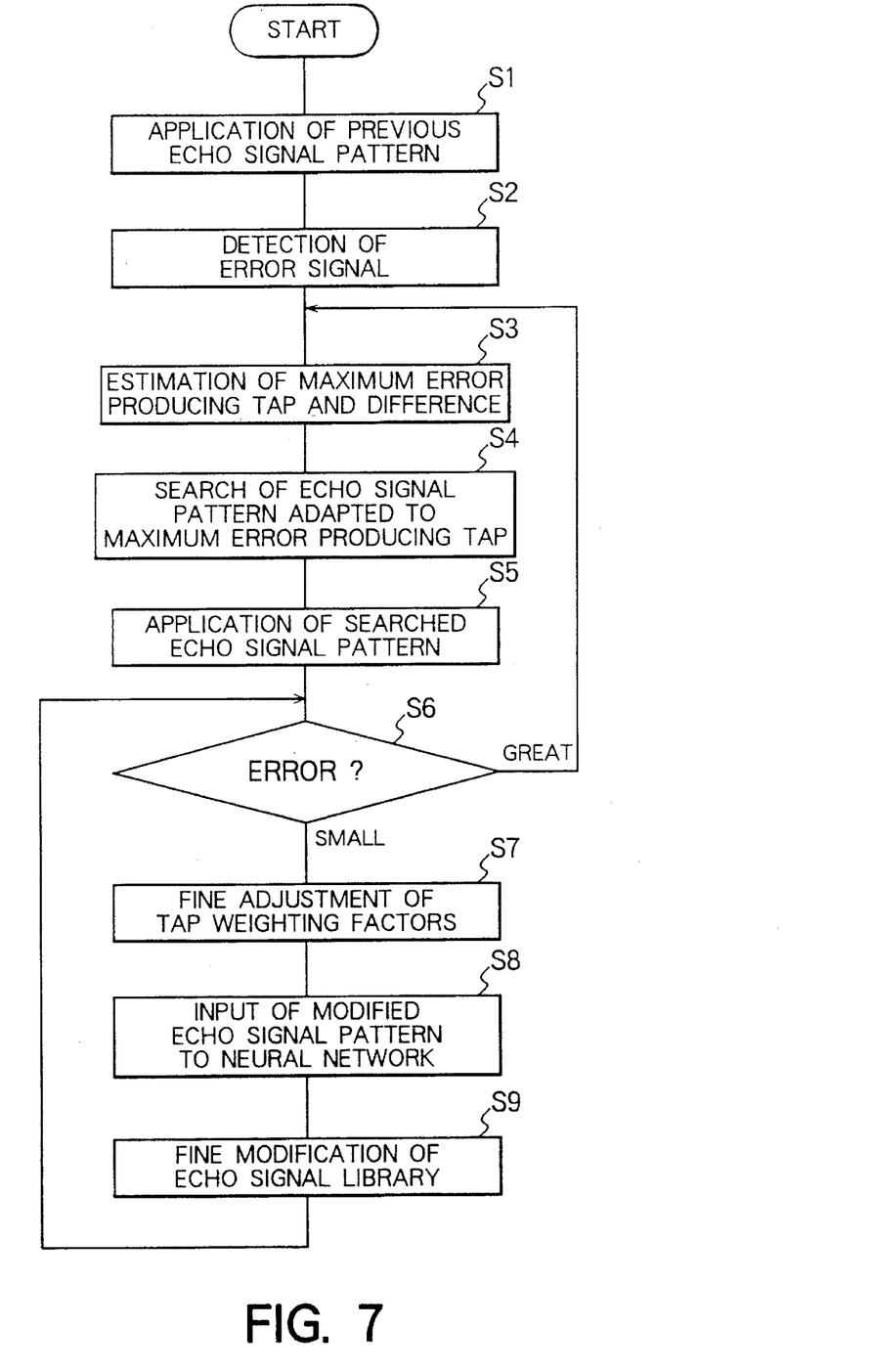
FIG. 7 is a flow chart for describing a detailed operation of a neural network controller of the echo cancelling device illustrated in FIG. 2.

FIG. 7 is a flow chart for describing the detailed operation of the neural network controller 5 of the echo cancelling device 14 illustrated in FIG. 2. At a step S1, the previous echo signal pattern is read and delivered to the adaptive echo cancellers 2 and 8. At a step S2, the controller is supplied with cancelling error signals detected by the adaptive echo cancellers 2 and 8. In a step S3, estimation is carried out of the maximum error producing tap producing the maximum error and the difference (maximum error). At a step S4, the echo signal patterns adapted to the maximum error producing tap are searched and read from the library in the order of the frequency of occurrence as the read-out echo signal patterns. At a step S5, the read-out echo signal patterns are delivered to the adaptive echo cancellers 2 and 8. At a step S6, judgement is carried out to detect whether or not the cancelling error signals delivered from the adaptive echo cancellers 2 and 8 are great or small. When the result of judgement indicates "great", the operation returns to the step S3. When the result of judgement indicates "small", fine adjustment of the read-out echo signal pattern is carried out at a step S7 so that the weighting factors for the plurality of taps of the adaptive echo cancellers 2 and 8 have optimum values. Thus, the modified echo signal pattern (echo signal pattern after modified) is produced. In accordance with the modified echo signal pattern (echo signal pattern after modified), the weighting factors for the plurality of taps of the adaptive echo cancellers 2 and 8 are finely adjusted to the optimum values. At a step S8, the modified echo signal pattern (echo signal pattern after modified) is supplied to the neural network in the neural network controller 5. At a step S9, when the library contains a similar pattern having a high similarity with the modified echo signal pattern, the pattern is slightly modified in accordance with the weighting factors determined by the neural network and is re-registered in the library. When the library contains no similar pattern having a high similarity with the modified echo signal pattern, the modified echo signal pattern is registered in the library in accordance with the frequency of occurrence. Then, the operation returns to the step S6.

As mentioned above, in FIG. 7, the echo cancelling operation is carried out by determining the weighting factors for the taps in accordance with the previous echo signal pattern (step S1). With reference to the error signal at that time, search is carried out in the library classified and arranged by the neural network to find the echo signal patterns adapted to the maximum error producing tap (steps S2, S3, and S4). In accordance with those patterns, the weighting factors for the taps are again determined to execute the cancelling operation (step S5).

In this event, in FIG. 7, when the error (residual error) is great at the step S6, the echo signal patterns adapted to the maximum error (residual error) producing tap are again searched from the library. Then, the cancelling operation is executed (steps S3, S4, and S5).

The above-mentioned steps are repeated until the error (residual difference) becomes smaller than a predetermined value at the step S6. Then, the weighting factors for the taps are finely adjusted and the cancelling operation is carried out (step S7). The modified echo signal pattern at this final cancelling operation is classified and arranged by the neural network to be recorded and held in the library (steps S8 and S9).

As described above, the neural network controller 5 of the echo cancelling device 14 is responsive to the cancelling error signals from the adaptive echo cancellers 2 and 8 and successively applying the echo signal patterns in the order from a higher frequency of occurrence in the past. Within a range of variation of the echo signal patterns patternized to a certain extent, it is possible to search and apply the adapted pattern in a very short time as the number of times of use is increased. In addition, it is almost unnecessary to carry out a training operation at every time by the use of the white noise.

While this invention has thus far been described in specific conjunction with a preferred embodiment thereof, it will now be readily possible for one skilled in the art to put this invention into effect in various other manners. For example, while two adaptive echo cancellers 2 and 8 are employed in the above embodiment, more than two adaptive echo cancellers may be provided in the echo cancelling device 14.

What is claimed is:

1. An echo cancelling device comprising a first transmission-side amplifier for amplifying an input transmission speech signal, a transmission-side adaptive echo canceller connected to said first transmission-side amplifier, a second transmission-side amplifier connected to said transmission-side adaptive echo canceller for amplifying an output signal of said transmission-side adaptive echo canceller to produce an output transmission speech signal, a first reception-side amplifier for amplifying an input reception speech signal, a reception-side adaptive echo canceller connected to said first reception-side amplifier, and a second reception-side amplifier connected to said reception-side adaptive echo canceller for amplifying an output signal of said reception-side adaptive echo canceller to produce an output reception speech signal, said transmission-side adaptive echo canceller being connected also to said reception-side adaptive echo canceller and being for producing a transmission-side pseudo echo signal in response to the output signal of said reception-side adaptive echo canceller and for cancelling said transmission-side pseudo echo signal from an output signal of said first transmission-side amplifier to produce an echo-cancelled transmission speech signal as the output signal of said transmission-side adaptive echo canceller, said reception-side adaptive echo canceller being connected also to said transmission-side adaptive echo canceller and being for producing a reception-side pseudo echo signal in response to the output signal of said transmission-side adaptive echo canceller and for cancelling said reception-side pseudo echo signal from an output signal of said first reception-side amplifier to produce an echo-cancelled reception speech signal as the output signal of said reception-side adaptive echo canceller, said echo cancelling device further comprising:

a neural network type controller using a neural network and connected to said transmission-side adaptive echo canceller;

said neural network type controller having an echo signal pattern library containing, as registered echo signal patterns, past echo signal patterns of past echo signals each of which is a part of said output reception speech signal that enters into said first transmission-side amplifier, said neural network type controller being responsive to cancelling errors from a plurality of taps of said transmission-side adaptive echo canceller and carrying out estimation of a maximum error producing tap, which is one of said plurality of taps that produces a maximum error, and of the maximum error of said maximum error producing tap, search of said registered echo signal patterns registered in said echo signal pattern library to find adaptive echo signal patterns adapted to said maximum error producing tap and said maximum error as estimated, change of weighting factors for the plurality of taps of said transmission-side adaptive echo canceller in accordance with said adaptive echo signal patterns as searched, identification of a particular adaptive echo signal pattern minimizing the cancelling errors from the plurality of taps of said transmission-side adaptive echo canceller as a result of the above-mentioned change of the weighting factors, preparation of a modified echo signal pattern for eliminating a residual error of said particular adaptive echo signal pattern as identified, fine adjustment of the weighting factors for the plurality of taps of said transmission-side adaptive echo canceller in accordance with said modified echo signal pattern, and registration of said modified echo signal pattern in said echo signal pattern library.

2. An echo cancelling device as claimed in claim 1, said neural network type controller being connected also to said reception-side adaptive echo canceller, said neural network type controller further having an echo signal pattern library containing, as registered echo signal patterns, past echo signal patterns of past echo signals each of which is a part of said output transmission speech signal that enters into said first reception-side amplifier, said neural network type controller being responsive to cancelling errors from a plurality of taps of said reception-side adaptive echo canceller and carrying out estimation of a maximum error producing tap, which is one of said plurality of taps that produces a maximum error, and of the maximum error of said maximum error producing tap, search of said registered echo signal patterns registered in said echo signal pattern library to find adaptive echo signal patterns adapted to said maximum error producing tap and said maximum error as estimated, change of weighting factors for the plurality of taps of said reception-side adaptive echo canceller in accordance with said adaptive echo signal patterns as searched, identification of a particular adaptive echo signal pattern minimizing the cancelling errors from the plurality of taps of said reception-side adaptive echo canceller as a result of the above-mentioned change of the weighting factors, preparation of a modified echo signal pattern for eliminating a residual error of said particular adaptive echo signal pattern as identified, fine adjustment of the weighting factors for the plurality of taps of said reception-side adaptive echo canceller in accordance with said modified echo signal pattern, and registration of said modified echo signal pattern in said echo signal pattern library.

3. An echo cancelling device comprising a first transmission-side amplifier for amplifying an input transmission speech signal, a transmission-side adaptive echo canceller connected to said first transmission-side amplifier, a second transmission-side amplifier connected to said transmission-side adaptive echo canceller for amplifying an output signal of said transmission-side adaptive echo canceller to produce an output transmission speech signal, a first reception-side amplifier for amplifying an input reception speech signal, a reception-side adaptive echo canceller connected to said first reception-side amplifier, and a second reception-side amplifier connected to said reception-side adaptive echo canceller for amplifying an output signal of said reception-side adaptive echo canceller to produce an output reception speech signal, said transmission-side adaptive echo canceller being connected also to said reception-side adaptive echo canceller and being for producing a transmission-side pseudo echo signal in response to the output signal of said reception-side adaptive echo canceller and for cancelling said transmission-side pseudo echo signal from an output signal of said first transmission-side amplifier to produce an echo-cancelled transmission speech signal as the output signal of said transmission-side adaptive echo canceller, said reception-side adaptive echo canceller being connected also to said transmission-side adaptive echo canceller and being for producing a reception-side pseudo echo signal in response to the output signal of said transmission-side adaptive echo canceller and for cancelling said reception-side pseudo echo signal from an output signal of said first reception-side amplifier to produce an echo-cancelled reception speech signal as the output signal of said reception-side adaptive echo canceller, said echo cancelling device further comprising:

a neural network type controller using a neural network and connected to said reception-side adaptive echo canceller;

said neural network type controller having an echo signal pattern library containing, as registered echo signal patterns, past echo signal patterns of past echo signals each of which is a part of said output transmission speech signal that enters into said first reception-side amplifier, said neural network type controller being responsive to cancelling errors from a plurality of taps of said reception-side adaptive echo canceller and carrying out estimation of a maximum error producing tap, which is one of said plurality of taps that produces a maximum error, and of the maximum error of said maximum error producing tap, search of said registered echo signal patterns registered in said echo signal pattern library to find adaptive echo signal patterns adapted to said maximum error producing tap and said maximum error as estimated, change of weighting factors for the plurality of taps of said reception-side adaptive echo canceller in accordance with said adaptive echo signal patterns as searched, identification of a particular adaptive echo signal pattern minimizing the cancelling errors from the plurality of taps of said reception-side adaptive echo canceller as a result of the above-mentioned change of the weighting factors, preparation of a modified echo signal pattern for eliminating a residual error of said particular adaptive echo signal pattern as identified, fine adjustment of the weighting factors for the plurality of taps of said reception-side adaptive echo canceller in accordance with said modified echo signal pattern, and registration of said modified echo signal pattern in said echo signal pattern library.

* * * * *